May 26, 1925. 1,539,751
H. J. LUEDERS
METHOD AND APPARATUS FOR USE IN MAKING BREAD
Filed Nov. 1, 1922 3 Sheets-Sheet 3

INVENTOR.
Henry J. Lueders
BY Vernon E. Hodges
ATTORNEY

Patented May 26, 1925.

1,539,751

UNITED STATES PATENT OFFICE.

HENRY J. LUEDERS, OF CHRISTIANA, PENNSYLVANIA.

METHOD AND APPARATUS FOR USE IN MAKING BREAD.

Application filed November 1, 1922. Serial No. 598,441.

*To all whom it may concern:*

Be it known that I, HENRY J. LUEDERS, a citizen of the United States, residing at Christiana, in the county of Lancaster and State of Pennsylvania, have invented certain new and useful Improvements in Methods and Apparatus for Use in Making Bread, of which the following is a specification.

My invention relates to a new and useful method, in conjunction with a new apparatus, for the testing of yeast, of which the following is a specification.

Compressed yeast is used almost exclusively in bread making and is produced by yeast manufacturers and sold and delivered by them to the baker. It is of a very perishable nature and never sold with a guarantee of a definite strength. Great care must be exercised from the time it is made until it is used to insure its keeping quality, and it must be kept at all times at a reasonably low temperature, as any increase in this temperature would have a weakening effect on its strength. Due to these conditions, there is a constant variation in the strength of yeast, very slight at times, at others considerable.

To produce good bread with regularity, it is of the utmost importance that the yeast is of uniform strength at all times. The large bakeries employ a plant chemist to test, beside their other ingredients, the strength of their daily supply of yeast, thereby enabling them to increase or decrease the amount they use in each dough in order to bring it up or down to the standard of strength, which they have adopted, but there are thousands of bakeries which have no chemist nor the knowledge and equipment to make these technical tests, hence they are handicapped in their efforts to produce good, uniform bread with regularity.

The object of my invention is to overcome these uncertain conditions by testing the yeast in such manner as to enable any baker to make these tests, and, after its strength is established, to adjust it to a standard of strength, by increasing or decreasing the amount used in each dough, to insure the usual, uniform fermentation in his doughs.

In the accompanying drawings:—

Figure 1:
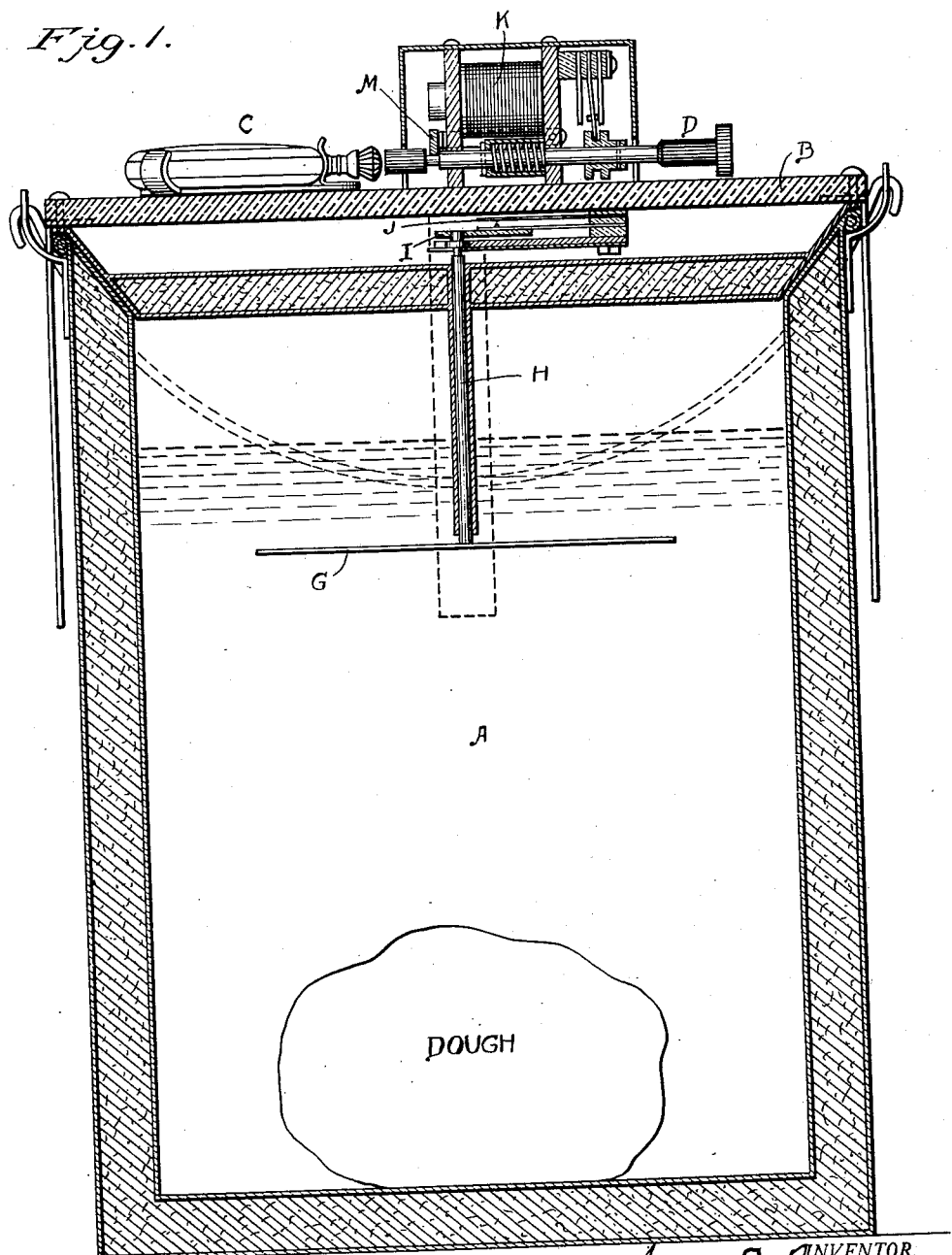
Fig. 1 is a vertical section through an apparatus adapted for carrying out my improved method.
Figure 2:
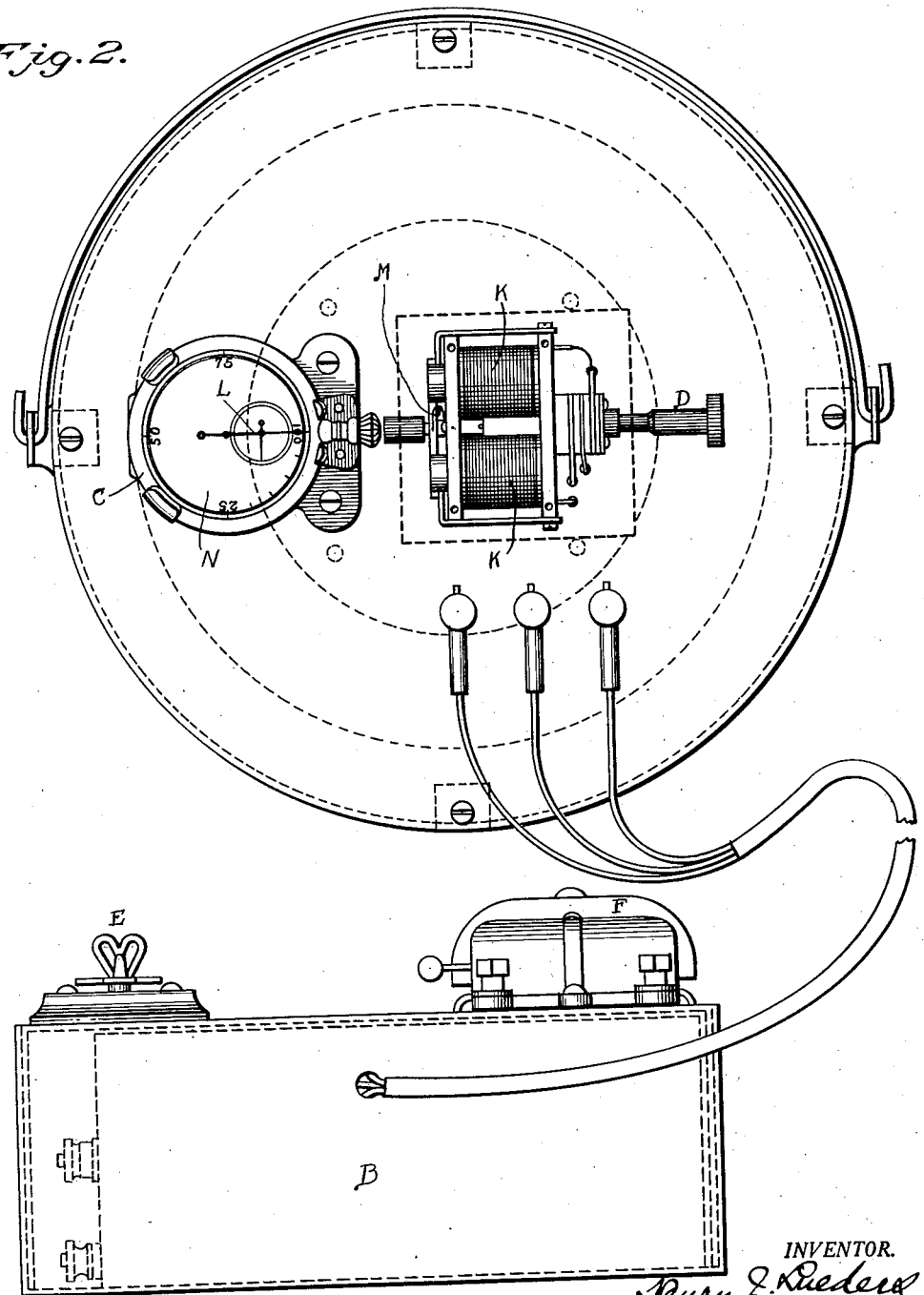
Fig. 2 is a plan view.
Figure 3:
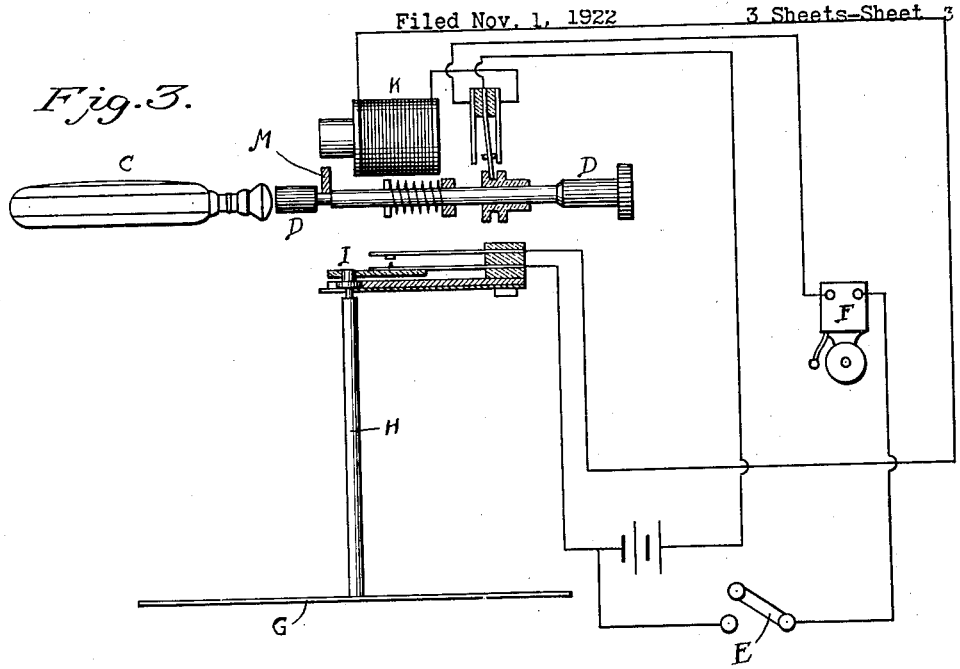
Figure 4:
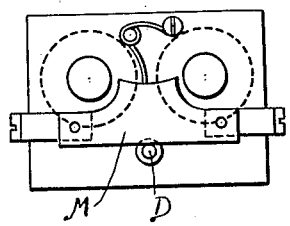
Figure 5:
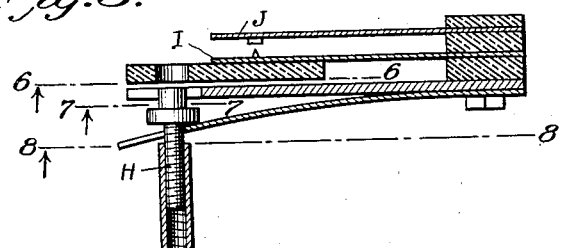
Figure 6:
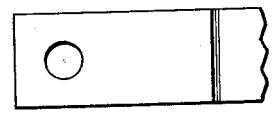
Figure 7:
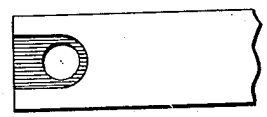

Fig. 3 a diagram;

Fig. 4 is a detail;

Fig. 5 is an enlarged section through the automatic switch;

Fig. 6 is a view looking upward from the line 6—6 in Fig. 5;

Fig. 7 is a similar view looking upward from the line 7—7 of Fig. 5; and

Figure 8:
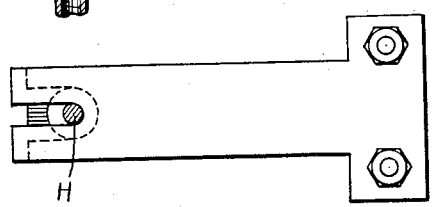

Fig. 8 is a similar view looking upward from the line 8—8 of Fig. 5.

The construction illustrated in the drawing is well adapted to my invention, but is by no means the only mechanical appliance for carrying it out, and consequently is only disclosed as an illustrative and practical form of mechanism for the purpose.

In carrying out my method of testing yeast, in conjunction with my apparatus, I proceed in the following manner:—First, I set aside a reasonable quantity of first-grade patent flour to be used exclusively in the making of these tests (and when one lot of this flour is used I set aside another lot of the same type for the same purpose). Then I fill the insulated vessel A of my apparatus with a liquid, preferably water, having a temperature of say from 80° to 100° F., and preferably about 95°. Then I scale accurately 1. pound of the flour I have set aside, .625 pounds of water, and .03125 pounds of the yeast I wish to test and mix these ingredients into a dough at the uniform temperature of 80 degrees F. Then I take 1.5 pounds of this dough, mould it round and preferably place it on a round piece of tissue or thin wax paper having a diameter of 7 inches. Then I submerge it in the water of the vessel A, paper downward to prevent sticking, adjust the top B, start the time-recorder C, and set the plunger D. As a simple form of time recorder, I have adopted the so-called stop watch for my purposes.

If audible signal of the completion of the test is desired, I turn on the switch E, connecting the bell F. Due to the fact that unfermented dough is heavier than water, it will settle to the bottom of the vessel A. As soon as fermentation starts in the sample I am testing, gases will form, which in due time will float the dough, causing it to come in contact with the disk G on the rod H, forcing these members upward until the movable contact I comes in contact with the stationary contact J, thereby closing the electric circuit, which in turn will cause the relay K to release the plunger D, by lifting the catch M, to stop the time-recorder C and ring the bell F. The time recorder will then indicate the number of minutes and seconds it took to complete the test. The small insert L on the large dial N of the recorder C will register the minutes, the large dial N the seconds, but not in the usual manner of 60 to the minute, but instead each minute is divided into 100 fractions. By this arrangement I am enabled to express the seconds on the decimal basis, which facilitates my figuring later, when I adjust the yeast to standard strength. Every minute of the time required to complete a test is expressed as 1 "minute-unit" of strength of the yeast being tested, and less than a minute as the decimal seconds thereof. In order to find the comparative strength of the sample I am testing I use a standard for strength of yeast, expressed in "minute-units". After making extensive yeast tests, I have adopted 21 "minute-units" as a fair standard of strength for my yeast, but this does not preclude the adoption of a higher or lower standard, if conditions should make such a change advisable. Any test recording less than 21 "minute-units" will indicate greater strength than standard, any recording higher than 21 "minute-units" will indicate less than standard strength. Assuming, for example, a sample of yeast I am testing has a strength of 26.25 "minute-units", in order to find the correct amount of yeast required when using this lot, and assuming I use 6 pounds of standard strength yeast in my doughs, I divide 26.25 by the standard 21, which equals 1.25; then I multiply 1.25 by 6, the amount of yeast I use regularly, which gives the result 7.5 pounds, and this is the correct amount of yeast I must use when using this particular lot, to insure the usual, uniform fermentation in my doughs. On the other hand, assuming another sample of yeast has a strength of 15.75 "minute-units". By dividing 15.75 by the standard 21 I obtain the results .75, which I multiply by 6 and which gives the results 4.5 pounds, and this is the correct amount of yeast I must use when using this particular lot of yeast, to insure the usual uniform fermentation in my doughs.

It will be apparent to those versed in the art and science of bread making that, with the aid of my invention, even those lacking in the knowledge of chemistry will be enabled to test the strength of their yeast at all times, which will make it possible for them to adjust the strength of the yeast to their standard of strength, which in turn will assure them a uniform fermentation in all their doughs, and they will be further enabled, through their constant practice and the assurance of a constantly uniform fermentation, to develop and establish the fermenting period on all doughs made from either patent, straight, or clear flours, based on the quantity of yeast they use per 100 pounds of flour.

In conclusion, my invention, briefly, might be said to be a method for testing and determining the strength of any lot of yeast, in a definite manner, and then adjusting this strength to a definite standard of strength to assure a constantly uniform fermentation in any dough of whatever nature it may be, and which requires yeast as a leavening agent; it also includes some form of apparatus for carrying out this method of testing and determining the strength of any lot of yeast.

It will be understood that this method and apparatus may be employed just as well in the testing of a sample of dough from an already mixed batch in order to get the strength of the yeast, as there is, obviously, no difference between making up a batch for the test, or taking a part of a batch already made, for the test, except that in one instance provision is made in advance with scientific accuracy to obtain a predetermined result, and in the other, the strength of the yeast that has already gone into a completed batch for the day's baking, is being determined.

I claim:

1. The method of testing yeast to ascertain its fermenting strength consisting in placing dough containing yeast in a liquid and registering the period of time it takes this dough to rise in the liquid.

2. The method of testing yeast to ascertain its fermenting strength, consisting in placing dough containing yeast in a confined liquid of suitable temperature and automatically registering the period of time it takes the dough to rise in the liquid.

3. The method of testing yeast to ascertain its fermenting strength, consisting in placing dough containing yeast in the bottom of a receptacle containing water, and automatically registering the period of time it takes the dough to rise in the water.

4. The method of testing yeast to ascertain its fermenting strength, consisting in placing dough containing yeast into a liquid, automatically registering the period of time it takes the dough to rise in the liquid, expressing the same in units of time, dividing the results by the standard unit for strength, and multiplying the product by the number of pounds and fractions of standard strength yeast, as regularly used in the making of dough, in order to get the yeast up or down to standard strength.

5. In a device of the general character described for use in testing the strength of yeast, a suitable receptacle adapted to contain a liquid and confine a specimen of dough containing yeast, and means in position to be actuated by the dough when it rises sufficiently to be buoyed up by the liquid to register the period of time it required to rise.

6. In an apparatus for use in yeast testing, a suitable receptacle adapted to contain a liquid and into which a specimen of dough containing the yeast to be tested is placed, a time-recorder, and means in position to be moved by the dough when it rises sufficiently to be buoyed up by the liquid to stop the time recorder.

7. In an apparatus for use in yeast testing, a suitable receptacle adapted to contain a liquid and into which a specimen of dough containing the yeast to be tested is placed, a time-recorder, means in position to be moved by the dough when it rises sufficiently to be buoyed up by the liquid to stop the time-recorder, and an alarm, and a switch capable of being turned to cause the alarm to sound when the dough has moved the movable device.

8. In an apparatus for use in the testing of yeast for strength, an insulated receptacle adapted to contain a liquid and confine a specimen of dough containing yeast to be tested and guided upward in any movement in the liquid, a recording device used with said receptacle, a member associated with said receptacle and said recording device, and adapted to be moved by the flotation of the sample of dough placed in said receptacle, said member being arranged to operate an electrical contact to register the time.

9. In an apparatus for use in the testing of yeast for strength, an insulated receptacle adapted to contain a liquid and confine a specimen of dough containing yeast to be tested and guided upward in any movement in the liquid, a recording device used with said receptacle, a member associated with said receptacle and said recording device, and adapted to be moved by the flotation of the sample of dough placed in said receptacle, said member being arranged to operate an electrical contact to register the time, an audible signal device, a means for closing a circuit therethrough, and a switch therefor, said audible signal actuated by the member which operates the recording device.

10. In a device of the character described, an insulated receptacle adapted to contain liquid and to confine a specimen of dough containing yeast to be tested, and guided in its upward movement when fermentation takes place, a cover for said receptacle, a time-recorder, and an audible signal device supported by said cover, and a member projecting from the cover into the receptacle adapted to be moved by the rise of the sample of dough therein, said member being arranged to close a circuit and cause the time it took to rise to be registered, and the audible signal to be sounded.

11. A device of the character described including a receptable adapted to contain a liquid and to confine a specimen of dough containing yeast, and means in position to be actuated when the dough rises sufficiently to be buoyed up by the liquid to regulate a timing piece for registering the period of time it required to rise.

12. A device of the character described including a receptacle adapted to contain a specimen of dough containing yeast, and means in position to be actuated by the dough when it rises to regulate a timing piece for registering the period of time it required to rise.

In testimony whereof I affix my signature.

HENRY J. LUEDERS.